Aug. 3, 1965   W. G. AXTELL ETAL   3,198,299
LUGGAGE CASES
Filed March 19, 1964   8 Sheets-Sheet 1

INVENTORS.
WILLARD G. AXTELL
CLAIR A. SAMHAMMER
BY MELVIN H. BEST
Van Valkenburgh and Fields
ATTORNEYS Aug. 3, 1965  W. G. AXTELL ETAL  3,198,299
LUGGAGE CASES
Filed March 19, 1964  8 Sheets-Sheet 2
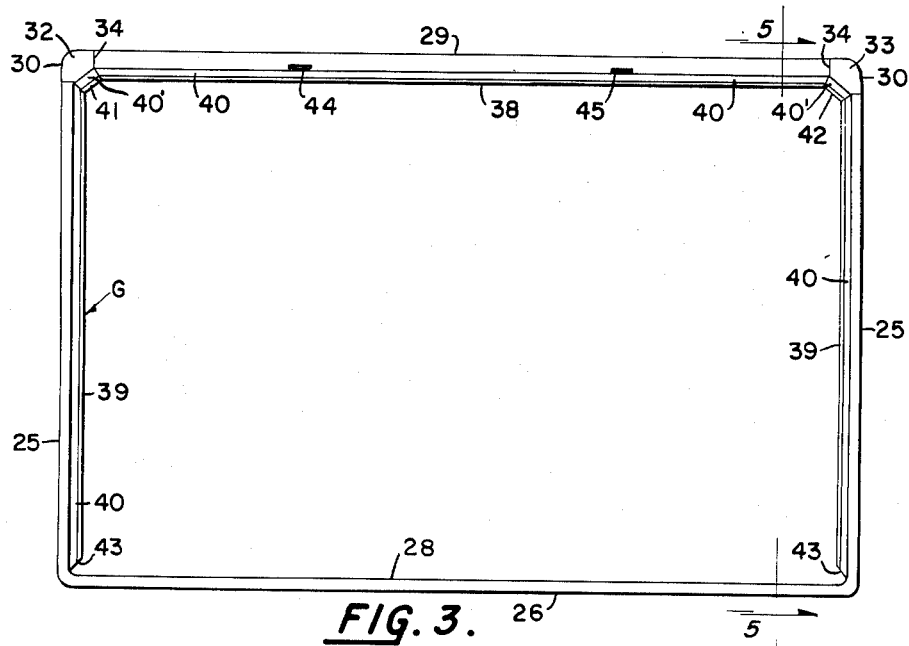
FIG. 3.
FIG. 4.
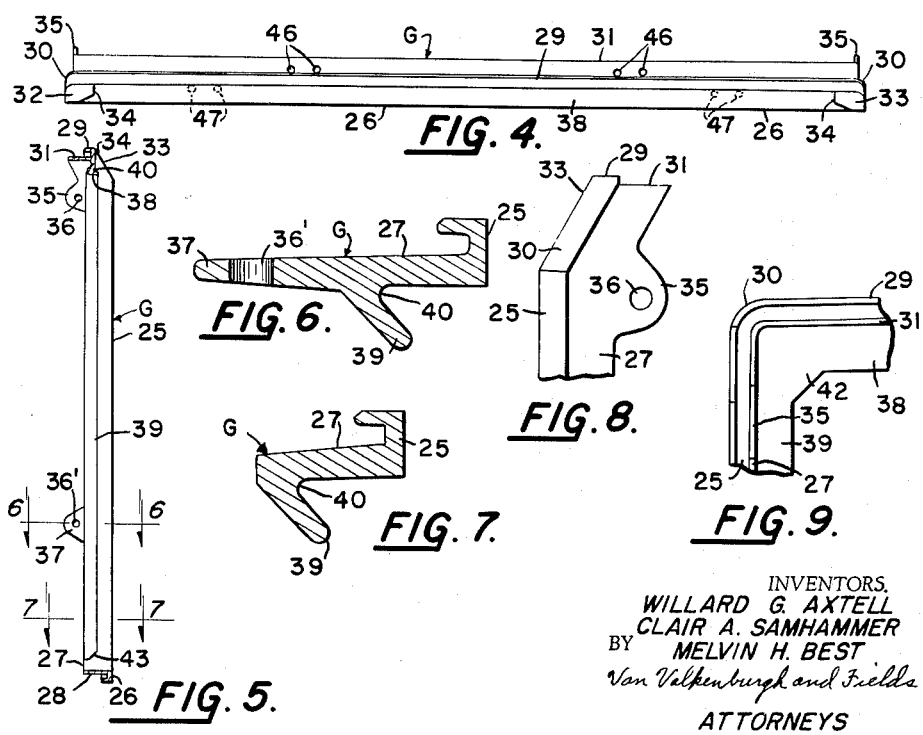
FIG. 5.
FIG. 6.
FIG. 7.
FIG. 8.
FIG. 9.
INVENTORS.
WILLARD G. AXTELL
CLAIR A. SAMHAMMER
MELVIN H. BEST
BY Van Valkenburgh and Fields
ATTORNEYS Aug. 3, 1965    W. G. AXTELL ETAL    3,198,299
LUGGAGE CASES
Filed March 19, 1964    8 Sheets-Sheet 3
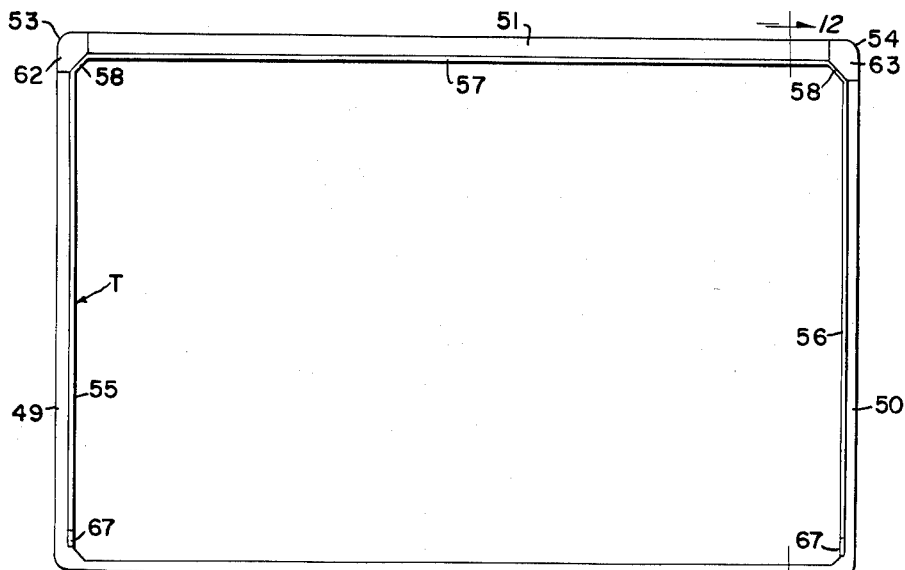
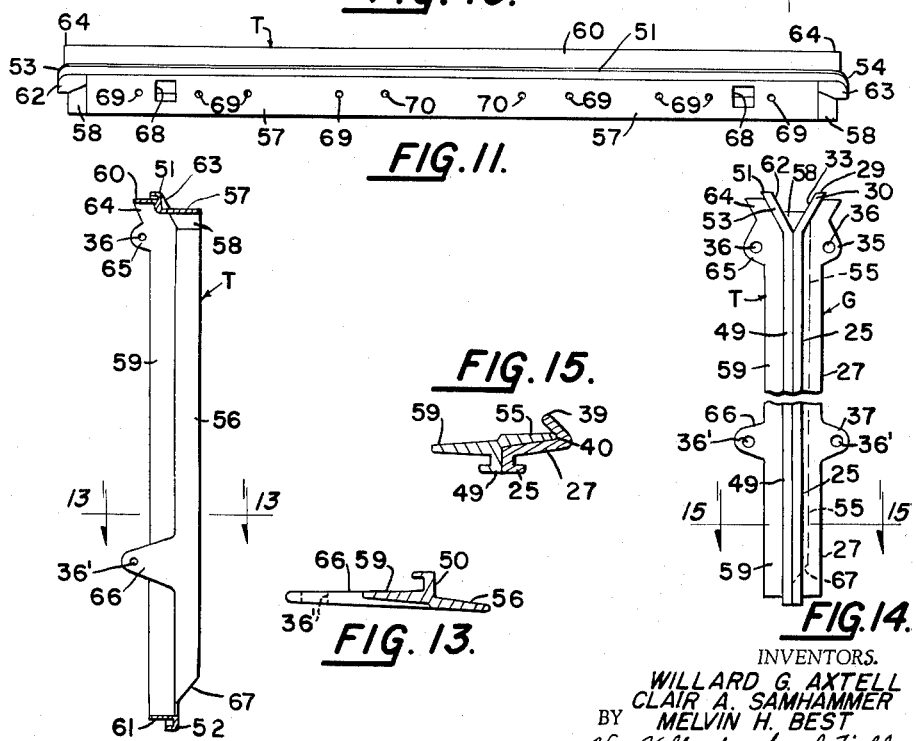
INVENTORS.
WILLARD G. AXTELL
CLAIR A. SAMHAMMER
MELVIN H. BEST
BY Van Valkenburgh and Fields
ATTORNEYS

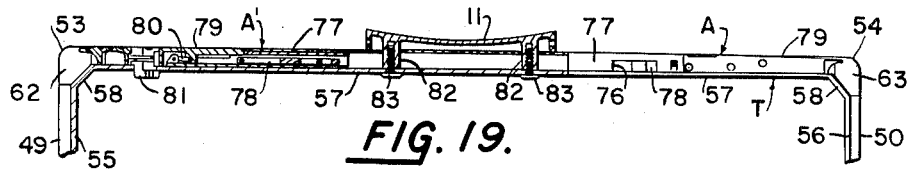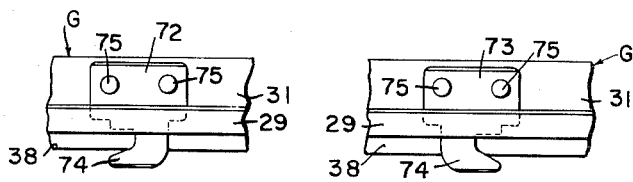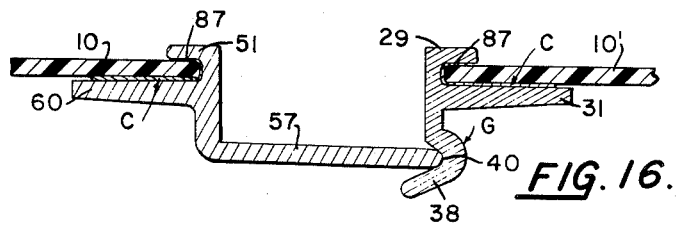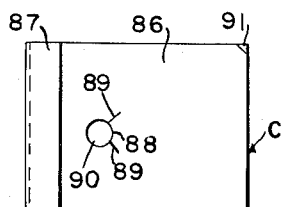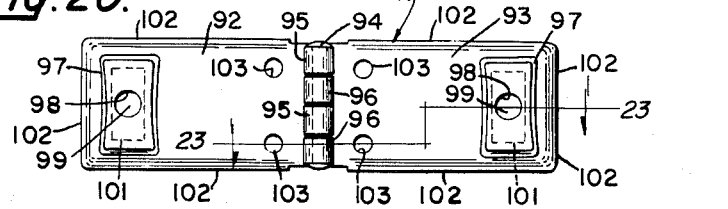

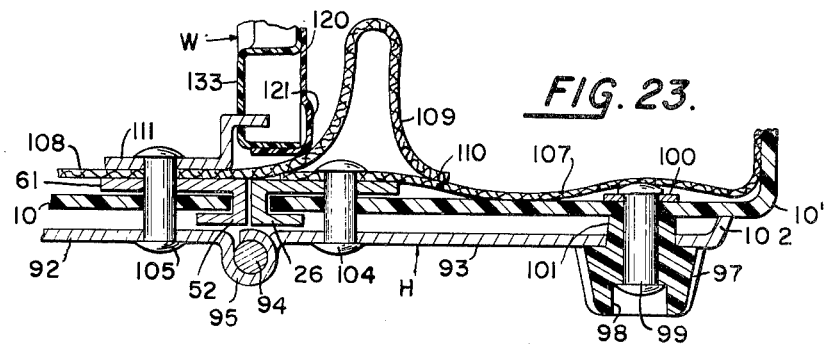
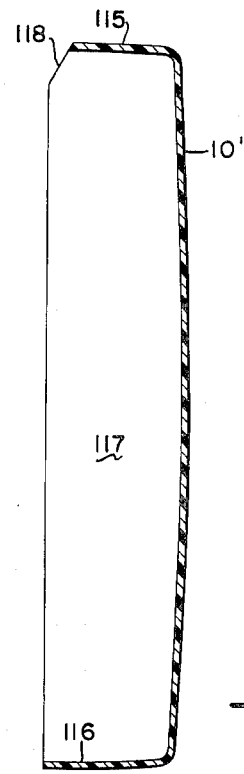

Aug. 3, 1965  W. G. AXTELL ETAL  3,198,299
LUGGAGE CASES
Filed March 19, 1964  8 Sheets-Sheet 6

INVENTORS.
WILLARD G. AXTELL
CLAIR A. SAMHAMMER
MELVIN H. BEST
BY Van Valkenburgh and Fields
ATTORNEYS

INVENTORS.
WILLARD G. AXTELL
CLAIR A. SAMHAMMER
BY MELVIN H. BEST

Van Valkenburgh and Fields

ATTORNEYS

Aug. 3, 1965 W. G. AXTELL ETAL 3,198,299
LUGGAGE CASES
Filed March 19, 1964 8 Sheets-Sheet 8

INVENTORS.
WILLARD G. AXTELL
CLAIR A. SAMHAMMER
MELVIN H. BEST
BY
Van Valkenburgh & Fields
ATTORNEYS

United States Patent Office 3,198,299
Patented Aug. 3, 1965

3,198,299
LUGGAGE CASES
Willard G. Axtell, Englewood, Colo., Melvin H. Best, Pasadena, and Clair A. Samhammer, Altadena, Calif., assignors, by mesne assignments, to Samsonite Corporation, Denver, Colo., a corporation of Colorado
Filed Mar. 19, 1964, Ser. No. 364,873
Claims priority, application Great Britain, Oct. 4, 1963
20 Claims. (Cl. 190—41)

This invention relates to a luggage case, and more particularly to a business case or attaché case. This application is a continuation-in-part of our application Serial No. 266,683, filed March 20, 1963.

Previous business cases have included both the soft sided and the rigid construction types. However, these cases have not entirely met the requirements for this type of luggage and in some instances have had serious shortcomings. For example, previous business cases, in many instances, were either relatively flimsy in construction or were too bulky and heavy, did not provide for filing small papers and for writing, or were not sufficiently rugged to withstand the rigors of usage. Other business cases, particularly when covered with leather, tended to become readily marred and scratched and did not have sufficiently positive locks or closing means.

Among the objects of this invention are to provide a novel business case or attaché case; to provide such a case which is of simple, yet durable and rigid construction; to provide such a case which has positively acting locks disposed in a protected position; to provide such a case which has generally smooth, planar sides, ends and bottom; to provide such a case having a rigid frame; to provide a novel tongue and groove frame construction providing a recess only at the top of the luggage case but meeting smoothly at the ends and bottom; to provide such a case having a rigid construction, yet is relatively light in weight; to provide such a case having excellent wearing qualities; to provide such a case having a removable writing pad therein; to provide such a case having an expandable file folder therein; to provide such a case which is maintained in any desired open position; and to provide such a luggage case which may be comparatively easily manufactured.

Additional objects and the novel features of this invention will become apparent from the description which follows, taken in conjunction with the accompanying drawings, in which:

FIG. 3 is an enlarged side elevation of a groove frame of the business case of FIG. 1;

FIG. 4 is a top plan view of the groove frame of FIG. 3;

FIG. 5 is a vertical section, taken along line 5—5 of FIG. 3;

FIG. 6 is a further enlarged, horizontal section, taken along line 6—6 of FIG. 5, showing the cross sectional configuration of the groove frame at that position;

FIG. 7 is a similarly enlarged, horizontal section, taken along line 7—7 of FIG. 5, showing at another position the cross sectional configuration of the groove frame;

FIG. 8 is a fragmentary side elevation, on an enlarged scale, of the upper corner of the groove frame of FIG. 3;

FIG. 9 is a fragmentary rear elevation of the upper corner of the groove frame shown in FIG. 8;

FIG. 10 is an enlarged, side elevation of a tongue frame of the business case of FIG. 1, which is adapted to interfit with the groove frame of FIG. 3;

FIG. 11 is a top plan view of the tongue frame of FIG. 10.

FIG. 12 is a vertical section, taken along line 12—12 of FIG. 10;

FIG. 13 is a further enlarged, horizontal section, taken along line 13—13 of FIG. 12, showing the cross sectional configuration of the tongue frame at that position;

FIG. 14 is a condensed side elevation, on an enlarged scale, of the tongue frame of FIG. 3 and the groove frame of FIG. 10 in interfitting relation;

FIG. 15 is a horizontal cross section, taken along line 15—15 of FIG. 14, illustrating the manner in which the ends of the tongue and groove strips interfit;

FIG. 16 is an enlarged, fragmentary, transverse section taken through the top of the tongue and groove frames when in closed position, without the lock and handle assembly, to illustrate the manner in which the shells of the case are attached to the frames and a recess is formed therebetween;

FIG. 17 is an enlarged, fragmentary top plan view of a small portion of the top of the groove frame of FIG. 3, after installation of one of the catches for use with the locks of FIG. 1;

FIG. 18 is similar to FIG. 17, but is spaced therefrom and shows the other catch installed on the groove frame;

FIG. 19 is a fragmentary side elevation of the upper portion of the tongue frame of FIG. 10, with the lock and handle assembly of the case of FIG. 1 installed thereon, partly in section to indicate the lock structure more clearly;

FIG. 20 is an enlarged, top plan view of a shell retaining clip, which also appears in FIG. 16;

FIG. 21 is a side elevation of the clip of FIG. 20;

FIG. 22 is an enlarged, bottom plan view of a hinge assembly of the case of FIG. 1;

FIG. 23 is an enlarged, fragmentary offset section, taken through a hinge at the bottom of the case at the position of line 23—23 of FIG. 22, to show the manner in which the hinge assembly is attached to the case and a writing pad is retained in the case;

FIG. 24 is an enlarged, central vertical section of one of a pair of complementary shells for the case of FIG. 1;

Figure 1:
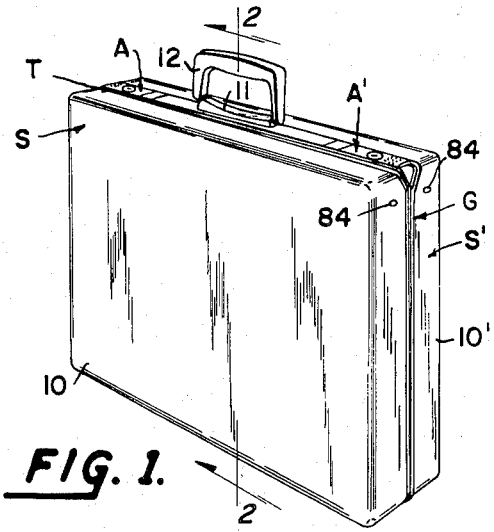
FIG. 1 is a perspective view of a business case constructed in accordance with this invention.

In accordance with this invention, a luggage case shown in FIG. 1, may include a pair of opposed luggage case sections S and S' including concave, complementary shells 10 and 10', respectively, preferably molded from a suitable plastic material, such as an acrylonitrile butadiene styrene copolymer, provided with an exterior surface patterned to simulate leather or other desired pattern, and colored as desired. The peripheral edge of shell 10 is attached to a tongue frame T and that of shell 10' to a groove frame G, which are adapted to interfit around the top and end edges of the respective sections and abut across the bottom, as in FIG. 2. Advantageously, tongue frame T and groove frame G provide a recess along the upper edge of the case for receiving latch assemblies A and A' and a support 11 for a handle 12. The bottom edges of the sections are pivotally connected by a pair of longitudinally spaced hinges, such as hinge H of FIGS. 2 and 22.

Figure 2:
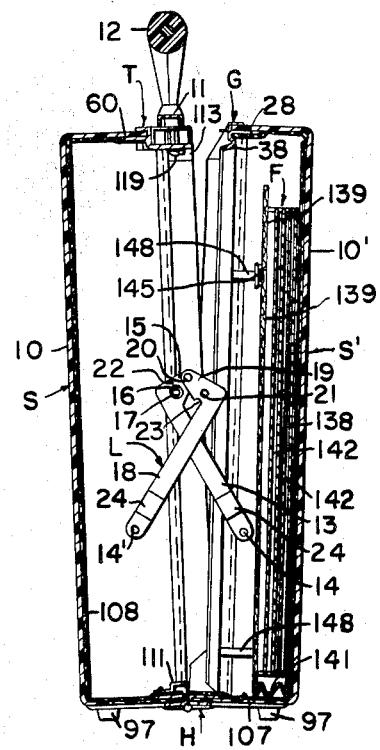
FIG. 2 is an enlarged, vertical section, taken along line 2—2 of FIG. 1, but with the case partially open.
Figure 25:
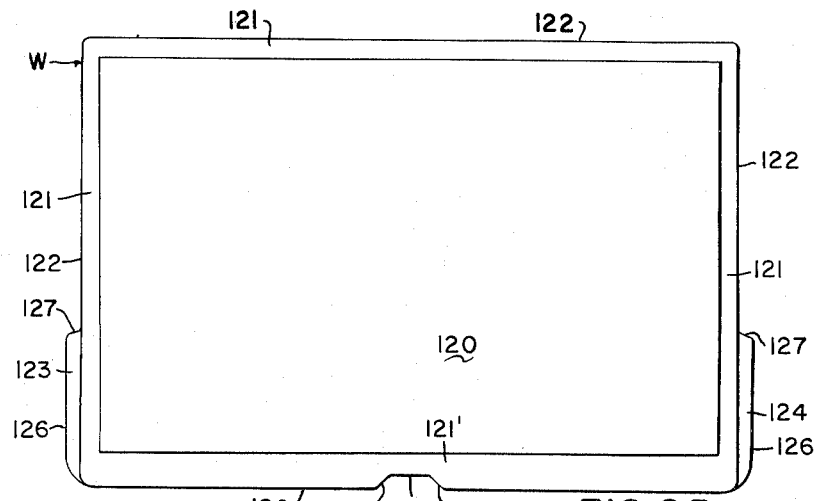
FIG. 25 is an enlarged, top plan view of a writing tray of the case of FIG. 1.
Figure 31:
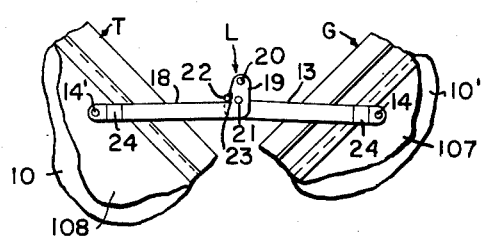
FIG. 31 is a fragmentary side elevation, looking from the inside, showing a friction linkage of FIG. 2 and a portion of the case sections in open position.
Figure 32:
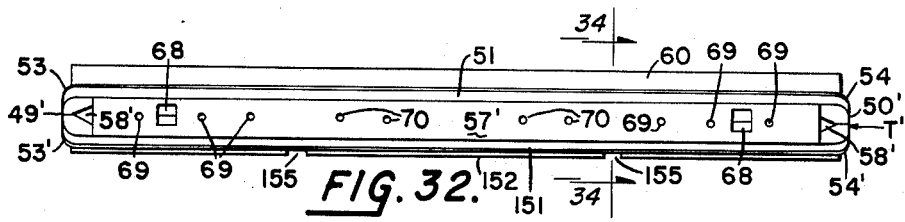
FIG. 32 is a top plan view of a frame providing a portion of a luggage case forming an alternative embodiment of this invention.

The case sections S and S' are held in any position, from fully closed to fully open, by a pair of friction linkages, such as linkage L of FIGS. 2 and 31, with a similar linkage provided at the opposite end of the case, on the inside thereof next to the frames T and G. Each friction linkage L includes an arm 13, pivoted at its inner end by a rivet 14 to frame G, and provided at its outer end with an angular offset 15 having a detent ball 16 mounted in a sleeve 17 therein. An opposite and co-operating arm 18 is pivoted at its inner end by a rivet 14' to tongue frame T and provided at its outer end with an angular offset 19 pivoted to offset 15 by a rivet 20. Offset 19 has an aperture 21 which receives ball 16 when the case is in open position, to releasably lock the case in open position, as with the case sections approximately 90° apart, as in FIG. 31. Offset 15 of arm 13 is conveniently provided with an inwardly extending ear 22, at its outer edge adjacent ball 16, which engages a notch 23 in the inner edge of offset 19 of arm 13, to provide a stop for such open position. In addition, the friction between arms 13 and 18 tends to hold the case sections in any other open position. Since the groove frame G will extend inwardly with respect to the point of attachment of arm 13, as will hereinafter appear, each of the arms 13 and 18 may be provided with an inwardly extending, angular offset 24 adjacent its inner end, to accommodate the groove frame G and permit the remainder of the arms 13 and 18 to be disposed in adjacent planes.

Conveniently, tongue frame T and groove frame G are each formed as an integral, generally rectangular part, as by die casting of a suitable metal, such as a magnesium alloy, No. AZ91B being suitable. Groove frame G, as in FIGS. 3-9, is provided with channels 25 extending along the two ends and a channel 26 formed integrally therewith and extending along the bottom, as in FIGS. 5-7, for receiving the end and bottom edges of the shell 10'. The inner flange 27 of each end channel 25 and inner flange 28 of bottom channel 26 extend rearwardly for a greater distance than the outer flanges thereof, to provide greater contact area with the shell edges, the outer flanges of the channels being limited in width for aesthetic purposes. A channel 29 extends along the top of the strip, but is offset rearwardly from the end channels 25 and is connected thereto by outwardly and forwardly divergent channels 30, as in FIGS. 3, 4, 8 and 9. Inner flange 31 of top channel 29 also extends rearwardly in spaced relation to the upper flange thereof, as in FIGS. 4 and 5. End channels 25 merge arcuately at the rear with the bottom channel 26 at the lower corners, as well as with upper channel 29 at the upper corners, as in FIGS. 5 and 9, to provide rounded corners to correspond with the inner edge of shell 10'. Each front surface 32 and 33 of divergent channels 30, at the respective upper corners, is disposed at an oblique angle, as in FIGS. 3 and 4, and is offset at the upper inner end 34 from the front surface of the upper channel 29 of the frame. Each end flange 27 is also conveniently provided with a pair of spaced, laterally extending ears, as in FIG. 5, such as an upper ear 35 which is provided with a central hole 36 adapted to receive a rivet extending through shell 10', and a lower ear 37 having a similar hole 36' therein for receiving rivet 14, about which arm 13 of the friction linkage L of FIG. 2 is pivoted.

An angular flange 38 depends from the front edge of upper channel 29, as in FIGS. 3 and 5, while an angular flange 39 extends inwardly and forwardly from the inner flange 27 of each end channel 25, to provide coplanar grooves 40 for receiving the tongue of tongue frame T. At the upper corners, flanges 38 and 39 are connected by integral, oblique flanges 41 and 42 to provide oblique grooves 40', as in FIG. 3. In this manner, a continuous groove is formed for receiving the end of the tongue of tongue frame T. The lower end 43 of each flange 39 is conveniently beveled, as in FIGS. 3 and 5, and is spaced from the lower channel 26, as shown, to facilitate closure of the case. A pair of spaced slots 44 and 45, as in FIG. 3, are provided in the front surface of channel 29, just above flange 31, for the attachment of a pair of catches for the latch assemblies A and A' of FIG. 1, as hereinafter described. The catches may be attached to flange 31 by rivets extending through holes 46 of FIG. 4, while the hinges H of FIG. 2 may be attached to the lower channel 26 by rivets extending through holes 47 in flange 28 of the lower channel, as at the dotted positions of FIG. 4.

The tongue frame T, as in FIGS. 10-13, includes a peripheral channel comprising end channels 49 and 50, joined to a top channel 51 and a bottom channel 52. Top channel 51 is offset rearwardly from end channels 49 and 50, being joined thereto by integral, arcuate channels 53 and 54, respectively. A tongue or flange 55 extends forwardly from end channel 49 and a similar tongue or flange 56 extends forwardly from the opposite end channel 50, while a wider tongue 57 extends forwardly from upper channel 51 and is joined integrally with tongues 55 and 56 by oblique tongue segments 58. It will be noted that the inner edges of tongues 55, 56 and 57 and tongue segments 58 are coplanar and that the tongues thus readily fit into coplanar grooves 40 and 40' of groove frame G when the luggage case sections S and S' are closed. As before, each inner flange 59 of end channels 49 and 50 extends rearwardly beyond the outer flanges therefor, while inner flange 60 of upper channel 51 and inner flange 61 of bottom channel 52 similarly extend rearwardly beyond the outer flanges therefor, since the outer flanges of these channels have a minimum width for the same reason as before. As will be evident, the tongues 55, 56 and 57 are offset inwardly from the corresponding channels 49, 50 and 51, as in FIGS. 12 and 13, particularly the upper tongue 57 which thus provides a sufficiently deep recess at the top of the case to receive the latch assemblies A and A' and the handle support 11. The upper corner channels 53 and 54 each provide an arcuate groove at the rear, similar to grooves 40' of the groove frame G, as shown in FIG. 9, and each is provided with an integral apron 62 and 63, respectively, which extends obliquely downwardly to tongue segments 58, as in FIGS. 11 and 12, to provide surfaces complementary to the surfaces 32 and 33 of the groove frame G. Thus, the apron 62 and surface 33, at one end, are symmetrical about the centerline at the end of the case, as in FIG. 14, while apron 63 and surface 34 at the opposite end are similarly symmetrical about the centerline of the case at that end.

Inner flange 64 of each arcuate channel 53 and 54 is also arcuate and extends rearwardly beyond the outer flanges of these channels and each is integral with the inner top flange 60 and inner end flange 59 to form a continuous groove. Advantageously, each inner end flange 59 is provided with a pair of rearwardly extending ears, as in FIGS. 12 and 13, including an upper ear 65, having a hole 36 adapted to receive a rivet extending through shell 10, and a lower, longer ear 66 having a similar hole 36' therein adapted to receive pivot rivet 14' for arm 18, ear 66 being longer to accommodate placement of rivet 14' the same distance from the centerline between the case sections as rivet 14 for arm 13 of friction linkage L. The lower end 67 of tongues 55 and 56 is conveniently beveled and spaced from the lower channel 52 to facilitate movement of the frames together. As in FIG. 10, tongue 57 is provided with a pair of spaced, rectangular apertures 68 having a beveled front edge for receiving locks which depend from lift levers of the latch assemblies A and A' and thus permit the lift levers to be locked in closed position when desired. Tongue 57 is further provided with rivet holes 69, for installation of the latch assemblies A and A', as well as holes 70 for attachment of screws, for installation of handle support 11.

As will be evident, both the tongue and groove frames may easily be cast from a light weight material, such as a magnesium alloy, and are adapted to fit together readily, as shown in FIGS. 14, 15 and 16, and provide a recess at the top of the case for receiving the handle and lock assemblies. Thus, end tongues 55 and 56, as in FIG. 15, and top tongue 57, as in FIG. 16, each engage grooves 40 provided by the end angular flanges 39 and upper angular flange 38, respectively. Also, the grooves provided by the channels 49, 50, 51, 52, 53 and 54 of tongue frame T receive the inner edges of shell 10, as in the manner shown in FIG. 16, while the inner edges of shell 10' are similarly received in the grooves provided by channels 25, 26, 29 and 30 of groove frame G. A series of clips C are utilized at spaced positions around the periphery of each shell 10 and 10', for a purpose described later and preferably constructed as disclosed and claimed in the copending application of Willard G. Axtell, Ser. No. 266,699, filed March 20, 1963.

As in FIGS. 17 and 18, a pair of complementary catches 72 and 73, each having a hook 74, are attached to the upper channel 29 of groove frame G, as by countersunk head rivets 75. Catches 72 and 73 are preferably installed in opposed position, extending through slots 44 and 45 of FIG. 3 and the base of each catch is mounted on inner flange 31 of the upper channel 29, with rivets 75 extending through holes 46 of FIG. 4. Preferably, the base of each catch is made as thin as possible to reduce interference with the edge of shell 10' fitting into the channel. Each catch is positioned to enter a slot 76 in the side wall of a housing 77, shown in FIG. 19, of the respective latch assembly A or A', which are conveniently of the type disclosed and claimed in the Lee F. Garmon and Willard G. Axtell U.S. Patent 3,034,327, although any other suitable latch structure may be utilized. As shown, each latch includes a slide 78 which is moved longitudinally by a pivoted lift lever 79, connected thereto by a link 80 adapted to be overthrown to hold the slide in closed position. Each slide 78 is conveniently urged to open position by a spring (not shown, but conveniently of the type shown in U.S. Patent No. 3,034,327) which thereby holds the slide in closed position against the overthrown link 80. As in the above U.S. patent, each slide 78 is conveniently provided with a lock 81 adapted to enter aperture 68 of FIG. 11 when the lift lever is in closed position, the lock being turned, as by a key, so that an offset portion thereof will be moved under tongue 57 for locking the latch. Handle support 11 is mounted at the center of the recess, having a pair of depending posts 82 which extend downwardly through appropriate holes in the top of housing 77 to tongue 57, being attached thereto by a pair of screws 83, extending upwardly through holes 70, of FIG. 11, in the tongue.

Conveniently, the edges of shells 10 and 10' are attached to the tongue and groove frames by a suitable adhesive, within the respective channels, reinforced at the upper corners by rivets 84 of FIG. 1, which extend through holes 36 of FIGS. 5, 6, 8, 12 and 14, as well as along the bottom by the rivets which attach hinges H to the case sections, but which are normally installed as one of the last operations. In order to hold the shells securely in position while the adhesive is setting, a series of clips C, previously referred to in connection with FIG. 16, are placed around the edge of each shell in spaced positions, such as two or three clips along each of the top, bottom and end edges of each shell, depending upon the size of the case. It will be understood that, although the clips C remain in position and assist the adhesive to a limited degree, their primary function is to hold the shell securely in position while the adhesive is setting and while there are no real forces applied tending to separate the shell from the corresponding frame. Each clip C is formed from relatively thin, preferably resilient metal, such as spring steel, having a hardness greater than the shells and frames, and, as in FIGS. 20 and 21, include a flat body 86 having at one end an angular flange 87 which engages the inner edge of the respective shell, as in FIG. 16. The body 86 is provided, at a central portion, with an upwardly extending prong 88 having sharp corners adapted to dig into the under surface of the shell and conveniently formed by upsetting at spaced slits 89 extending to a punched hole 90. Thus, prong 88 prevents the respective shell from slipping out of the clip. At the corners opposite flange 87, prongs 91 are struck downwardly, so that the sharp corners will dig into the respective flanges of the tongue and groove frames, so that the clips will not slip out of the channels. It may also be desirable to place a few score lines, as by a sharp instrument, along the frame flanges at the position of the end prongs 91, to insure that these prongs will dig further into the metal of the frames. Since the clips will resist a force of reasonable magnitude, the shells will be held securely in the frame channels, until the adhesive has set.

The case sections S and S' are hinged together along their lower edges by a pair of hinges, such as hinge H of FIGS. 2 and 22, although more than two hinges may be used, if desired. Conveniently, hinge H includes two hinge plates 92 and 93, as in FIGS. 22 and 23, which are similar in construction but opposed in position and are pivotally connected together by a hinge pin 94 extending through ears 95 and 96, respectively extending downwardly in spaced position from the inner end of hinge plates 92 and 93 and interleaved, as in FIG. 22. Conveniently, a supporting foot 97 is mounted adjacent the outer end of each of the hinge plates, which extend laterally to a position adjacent the side of each shell 10 and 10', as in FIG. 23, so that the supporting feet will be spaced laterally at each hinge a sufficient distance and also so that the hinges will transmit the load from the feet to the metal frames, as well as to the shells. Each foot has a countersunk hole 98 therethrough, for receiving a rivet 99 whose opposite end is spaced from the shell, such as shell 10', by a washer 100, to provide a greater bearing area against the shell for the rivet. A rectangular neck 101 at the upper end of each foot 97 extends through a corresponding hole in the hinge plate and abuts against the underside of the shell. Thus, neck 101 acts as a spacer for the corresponding hinge plate, which is provided at its outer end with an upturned flange 102, as in FIG. 23, which engages the underside of the corresponding shell and may extend around the sides of the hinge plate. Also, each hinge plate 92 and 93, as in FIG. 22, is provided with a pair of spaced holes 103 for receiving rivets, such as rivets 104 and 105 of FIG. 23, which extend through the corresponding shell 10 or 10' and also through the flange 28 of bottom channel 26 of groove frame G and flange 61 of bottom channel 52 of tongue frame T, respectively. A fabric lining 107 extends around the inside surface of shell 10' and over rivet 99, covering the same, and the lower edge thereof is attached by rivets 104, while a similar fabric lining 108 extends around the inside surface of shell 10, as in FIG. 2, and is similarly held by rivets 105. A joint cover strip 109, which is looped with the case in closed position to accommodate opening of the case, extends across the hinge joint, thereby covering the gap between the case sections, when the case is open, to prevent papers or other articles in the case from becoming wedged in the joint. One edge of cover strip 109 is attached to lining 107, as by stitching 110, and may be similarly attached to lining 108 or form an extension thereof, as shown. Rivets 105 also conveniently attach a U-shaped hook 111, at the position of each hinge, which hooks are adapted to support the inner end of a removable writing tray W, having a pair of slots 112 adapted to engage the respective hook 111.

Conveniently, the shells 10 and 10' are molded from a plastic or other suitable material with good wearing qualities, as indicated previously. The shells 10 and 10' may be identical in size and shape, but installed in opposed, complementary positions, so that only one mold is necessary for making both shells. Thus, shell 10', as in FIG. 24, is provided with a slightly convex side wall 114, slightly convex top and bottom walls 115 and 116 and similarly slightly convex end walls 117, all of the walls being joined to adjacent walls by rounded corners. The inner edges of the top and end walls are conveniently coplanar to fit into the corresponding channels of the tongue and groove frames, while the inner edge of the top wall is offset outwardly from the inner edges of the end walls and merges therewith along an arcuate, beveled edge 118, each of which fits into the groove formed by one of the arcuate channels 30 of FIG. 9, the corresponding beveled edges of shell 10 fitting into the grooves formed by the arcuate channels 53 and 54 of FIGS. 10 and 11, of the tongue frame T.

The writing tray W is preferably constructed as disclosed and claimed in the copending application of James O. Donald and James Richard Sandburg, Ser. No. 281,416, filed May 20, 1963, and is adapted to be supported at its inner end by hooks 111, as indicated previously, and at its outer end by stops 119 of FIG. 2, each of which conveniently comprises a hollow shell covering the inside of an aperture 68 of FIG. 11, thus preventing articles in the case from extending into either aperture 68. As in FIGS. 21–24, the writing tray W comprises an upper section which may be superimposed over and attached, as by adhesive, to a lower base, both of which may be molded from a suitable plastic, such as polystyrene or an acrylonitrile butadiene styrene copolymer, which may also be utilized in molding the feet 97. The upper section has a flat, generally rectangular upper surface 120 surrounded by a raised border 121 having a flange 122 depending from the rear edge and from the side edges for approximately two thirds of the distance to the front edge, i.e., to the rear edges of outer ledges 123 and 124, to accommodate movement of friction linkages L, when writing tray W is in the case, as in FIG. 2. Each of ledges 123 and 124 extend from the side and around the front of the upper section, conveniently at the same elevation as surface 120, to a front recess 125, which provides a hand grip for lifting the writing tray out of the case, if desired. Each ledge 123 and 124 also has an outer depending flange 126 which is integral with an oblique flange 127 joined to flange 122, as in FIG. 26, while each flange 126 is also integral with the front flange and angular flanges 128 forming recess 125. If desired, a layer of vinyl or other suitable plastic material may be provided on flat surface 120 to provide a better writing surface.

Figure 26:
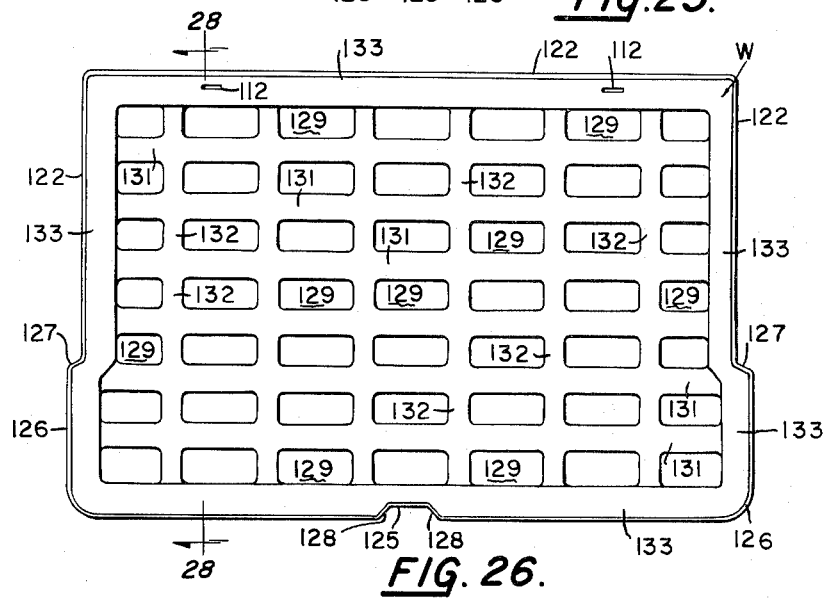
FIG. 26 is a bottom plan view of the writing tray of FIG. 25.
Figure 27:
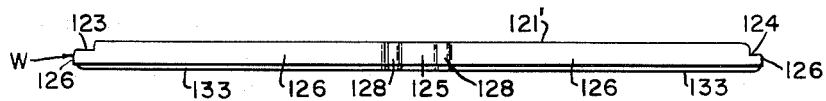
FIG. 27 is a front elevation of the writing tray of FIG. 25.
Figure 28:
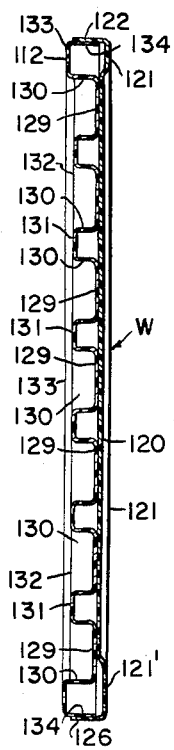
FIG. 28 is an enlarged, vertical section of the writing tray of FIGS. 25–27, taken along the line 28—28 of FIG. 26.

The upper surface of the base, which fits into the upper section, conveniently comprises a series of equally spaced rectangles 129, as in FIG. 26, from the four sides of each of which integral flanges 130, as in FIG. 28, extend downwardly to a connected series of spaced lateral ribs 131 and spaced longitudinal ribs 132, to form a honeycomb structure with rectangular openings therein, as in FIG. 26. A lower border 133 extends around the honeycomb structure and is provided with a peripheral upstanding flange 134, which fits within flanges 122, 126, 127 and 128, as in the manner of FIG. 28, and corresponds in contour thereto, including recess 125. When the base and upper section are fitted together, flange 134 of the base is secured to the corresponding flanges of the upper section, by a suitable adhesive. The hollow, honeycomb structure of the writing tray W permits the thickness of the writing tray to be reduced to a minimum, with a relatively low total weight, while providing sufficient strength to permit a great deal of force to be exerted on the writing surface 120, without bending. Conveniently, the pair of spaced slits 112, which permit the inner edge of the writing tray to be placed on the spaced hooks 111, as in FIGS. 2 and 23, are provided in the rear portion of border 133, as in FIGS. 26 and 28.

Figure 29:
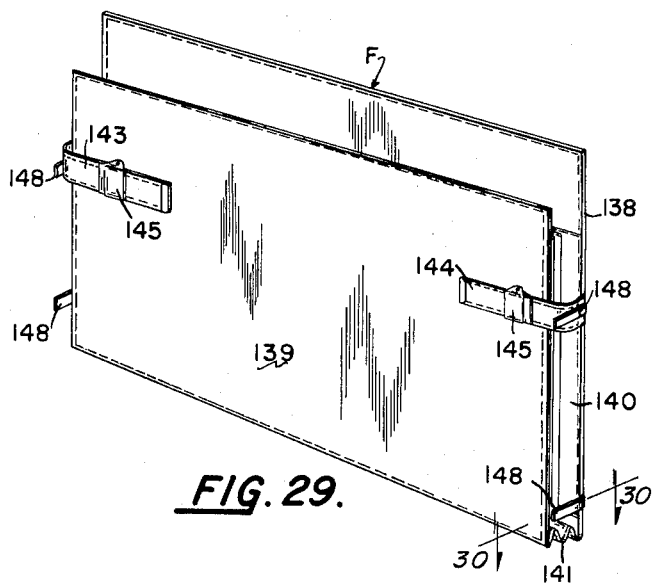
FIG. 29 is an enlarged, perspective view of an expandable file folder provided in the case of FIG. 1.
Figure 30:
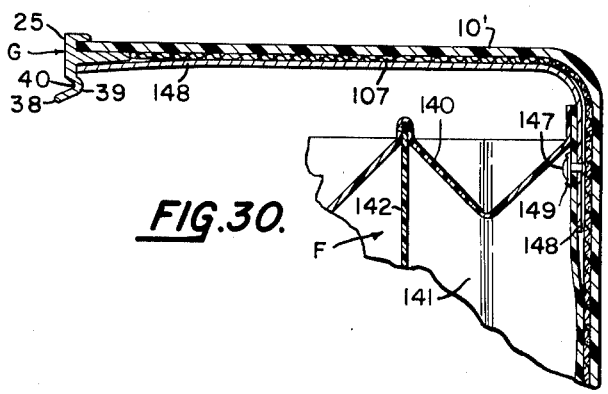
FIG. 30 is a vertical section, taken through the file folder and case, comprising an enlargement of a portion of FIG. 2, showing the manner in which the file folder is held in the case.

The business case may also be provided with an expandable file folder F, as in FIGS. 2 and 29, which includes a rear panel 138 connected to a front panel 139 by means of expandable side panels 140 and an expandable bottom panel 141, as in FIG. 29, each of which may be formed of a suitable plastic or plastic impregnated fabric. Thus, the file folder may be expanded to receive various papers and other documents. Advantageously, the file folder F is provided with a plurality of spaced dividers 142, as in FIG. 2, while straps 143 and 144, as in FIG. 29, may be attached to opposite sides of back panel 138 and each provided with a catch 139. Conveniently, each catch 145 is movable along the respective strap, so as to allow for expansion of the file, whereby the file folder F requires only a space sufficient to accommodate the contents thereof. Rear panel 138, which extends above front panel 139, is provided with laterally spaced pairs of holes 146, for attachment by rivets 147 to a pair of resilient brackets 148, of which one is shown in FIG. 30. Conveniently, each bracket 148 is U-shaped, the base being attached to the file folder and the legs being angular, to follow the contour of shell 10', as shown, so that the end of each leg abuts groove frame G, inside the hook in flange 38. Due to the spring-like quality of brackets 148, which may be formed of a special aluminum alloy, they will hold file folder F in the position shown in FIG. 2, since the resilient brackets 148 will urge the file folder against the bottom of case section S'. The file folder is readily removed from the case, when desired, merely by opening the case and pulling the lower end of the file folder out of the case section S', whereupon the upper end can be slipped downwardly to remove the spring brackets 148 from behind groove strip G. The file folder can similarly be readily placed again in the case, merely by slipping brackets 148 behind groove frame G and pushing the lower end of the file folder into case section S'. Advantageously, rivets 147 are prevented from pulling through rear panel 138 of the file folder by washers 149 of FIG. 30.

The writing tray W is pivotal upwardly about hooks 111, when access to the space beneath the writing tray is desired, but the writing tray is also removable or replaced, when desired, since it is readily slipped on or off hooks 111.

The alternative embodiment illustrated in FIGS. 32–36 is almost identical in appearance, when closed, to the first embodiment, as shown in FIG. 1, the difference being the absence in the second embodiment of the parting line between the case sections, visible at each end. Thus, the alternative embodiment includes a pair of complementary shells 10 and 10', similar to the shells of the first embodiment, and a pair of frames T' and G', the frame T' being similar to frame T but including additional portions corresponding to portions of the frame G of the first embodiment. The frame T' is conveniently cast, as of a magnesium alloy and in the same manner as frame T, while the frame G' may be cast or may be formed from an extruded or rolled strip, as of aluminum, bent to the desired shape and the abutting ends connected together, such as at the position of one of the hinges H on the underside of the case. The frame T', as in FIGS. 32 and 33, includes end channels 49' and 50', joined to a top channel 51 and a bottom channel 52'.

Figures 33, 34:
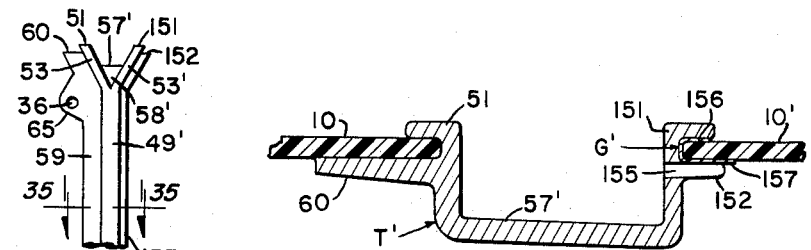
FIG. 33 is an end view of the frame of FIG. 32.
FIG. 34 is an enlarged, fragmentary cross section of such alternative embodiment, taken at the position of line 34—34 of FIG. 32.
Figure 35:
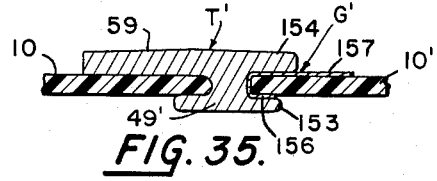
FIG. 35 is an enlarged, fragmentary cross section taken at the position of line 35—35 of FIG. 33.

Thus, channel 51 is offset from the end channels and is joined thereto by integral, arcuate channels 53 and 54, while an inner flange 60 of upper channel 51 and an inner flange 61 of lower channel 52' extend rearwardly beyond the outer flanges thereof, as before. Also, inner flanges 59 of end channels 49' and 50' extend rearwardly beyond the outer flanges thereof and are conveniently provided with rearwardly extending ears 65 and 66, having the respective rivet holes 36 and 36'. Tongue 57', which extends forwardly from upper channel 51, is integral therewith and differs from tongue 57 of the previous embodiment in also being integral with an upper channel 151, which corresponds to upper channel 29 of the frame strip G of the first embodiment. Channel 151 is provided with an inner flange 152, which is slightly wider than the outer flange thereof, while channel 151, as in FIG. 34, is adapted to receive the frame G', attached to the edge of shell 10'. Top channel 151 is connected to end channels 49' and 50' by arcuate channels 53' and 54', similar to but complementary to channels 53 and 54, with an oblique section 58' between channels 53 and 53' and channels 54 and 54'. The end channels 49' and 50' are dual channels, i.e. provided with a channel on each side, the channel on one side, i.e. at inner flange 59, being adapted to receive the edge of shell 10 in fixed position, while the channel on the opposite side, i.e. between outer flange 153 and inner flange 154, being adapted to receive the frame G', attached to the edge of shell 10', as in FIG. 35. As will be evident, the frame T' is the only frame visible on the exterior, with the luggage case closed, since the frame G' is received in frame T' and is hidden by the outer flanges of channels 151, 53', 54', 49' and 50'.

As in the first embodiment, tongue 57' is provided with a pair of spaced rectangular apertures 68, each having a beveled front edge for receiving a lock which depends from the lift lever of the respective latch assembly, as well as rivet holes 69, for installation of the latch assemblies, and holes 70 for attachment of screws for installation of a handle support. The latch assembly, handle and handle support are conveniently similar to those of the first embodiment; thus, a longitudinal section of the upper portion of frame T' will be similar to FIG. 19. As will be evident, channels 51 and 151 and tongue 57' provide a space for receiving the latches and handle support, in a manner similar to the first embodiment. Inner flange 152 of channel 151 is further provided with a pair of slots 155, which extend through the web of channel 151, as in FIG. 34, to accommodate movement of catches similar to catches 72 and 73 of FIGS. 17 and 18 into engagement with the latches.

Figure 36:
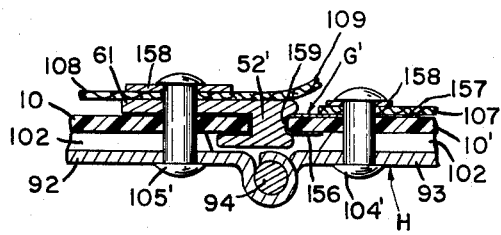
FIG. 36 is an enlarged, fragmentary cross section taken at the position of one of the hinges on the underside of the luggage case.

The frame G' is preferably J-shaped in cross section, having an outer flange 156, preferably having a width less than the outer flanges of the corresponding channels of the frame T', so as to be hidden thereby when in closed position, and a wider inner flange 157, which conveniently has sufficient width to permit the attachment of the frame G' to the edge of shell 10', as by rivets corresponding to rivets 84 of FIG. 1 and rivets 104', as in FIG. 36, which attach one half of a hinge H thereto. The top of frame G' is offset from the ends thereof to correspond to the shape of the end and top channels of the frame T'. Catches, similar to catches 72 and 73 of FIGS. 17 and 18, as indicated, are conveniently attached, as by riveting, to inner flange 157 of frame G' at positions opposite slots 155.

The hinges H, as in FIG. 36, are conveniently similar in construction to the hinges utilized in the first embodiment. Thus, hinge plates 92 and 93 are pivotally connected by a hinge pin 94, which extends through interleaved ears at the inner ends of the hinge plates. Also, an upturned flange 102 of each hinge plate abuts the underside of the corresponding shell at the end of each hinge plate and extends along each side of each hinge plate, terminating slightly outwardly from the channel 52' and frame G'. Each hinge plate 92 and 93 is provided with a pair of spaced holes for receiving rivets 104' and 105', which extend through the corresponding shells 10 and 10', with rivet 104' also extending through flange 157 of frame G' and rivet 105' extending through flange 61 of channel 52' of frame T'. As before, rivets 104' may attach a lining 107 on the inside of one section of the luggage case and rivet 105' may similarly attach a lining 108, the latter conveniently extending as a loop 109 to form a cover strip for the joint between the case sections. The rivets 104' and 105' are conveniently headed against washers 158, particularly in the event that the writing tray and the angle support therefor, as in the first embodiment, are omitted. The inner edge 159 of channel 52' may be flat or may be grooved to receive the inner edge of the frame G', while supporting feet similar to feet 97 of FIGS. 2 and 22 may be associated with each hinge H and the respective shells 10 and 10', in a manner similar to the first embodiment.

From the foregoing, it will be evident that the requirements and objects hereinbefore set forth have been fulfilled to a marked degree. A business or attaché case has been provided which is of simple and durable construction. Also, this case has generally planar side surfaces without any unsightly recesses along the ends or bottom, being provided with a recess across the top which receives the lock assemblies so that they do not protrude above the upper surface of the case. This recess is conveniently formed between a tongue and groove frames or in one frame only and the case is of rigid construction, yet relatively light in weight. Since the inner edges of the top and end tongues are coplanar in one embodiment, the case is attractive in appearance when open. Both frames of each embodiment may be formed by casting, although in the second embodiment, the principal frame may be formed by casting while the opposite frame may be formed from a rolled or extruded strip at a reduction in cost but sacrifice of appearance when the case is open. However, in each embodiment, the case has excellent wearing qualities and has a minimum of metal exposed to wear.

Although two preferred forms of this invention have been illustrated and described, it will be understood that other embodiments may exist and that various changes and variations may be made without departing from the spirit and scope of this invention.

What is claimed is:

1. A luggage case comprising:
   two opposed concave shells, each having a top wall, a bottom wall, end walls and a side wall;
   a first frame having top, bottom and end channels extending around the peripheral edge of one shell and attached thereto, at least the major portion of the top channel being spaced outwardly from the end channels;
   a second frame having top, bottom and end channels extending around the peripheral edge of the other shell and attached thereto, at least the major portion of the top channel being spaced outwardly from the end channels;
   said first frame having a tongue extending from said top channel thereof to provide a recess along at least a major portion of the top of said luggage case;
   said frames having interfitting means for engagement when said luggage case is closed; and
   hinge means pivoting said frames together at the bottom of said case.

2. A luggage case, as defined in claim 1, wherein said top channel of each frame is spaced outwardly from said end channels across the top of said luggage case.

3. A luggage case, as defined in claim 1, wherein:
   said hinge means includes at least two spaced hinges, each comprising a pair of hinge plates pivoted together for joining said sections together, each hinge plate having inner and outer holes therein, said outer holes being larger than said inner holes;

means extending through said inner holes connecting said hinge plates to the respective first and second frames;

a foot having a neck extending through each said outer hole, said foot abutting said hinge plate and the inner end of said neck abutting the corresponding shell; and connecting means attaching each said foot and the corresponding shell.

4. A luggage case, as defined in claim 1, including a writing tray adapted to be mounted in said luggage case; and hooks attached to the inside of said luggage case for holding said writing tray in said luggage case.

5. A luggage case comprising:

two opposed concave shells, each having a top wall, a bottom wall, end walls and a side wall;

a groove frame having top, bottom and end channels extending around the peripheral edge of one shell and attached thereto, the top channel being spaced outwardly from the end channels;

said groove frame having top and end grooves facing in a direction opposite the end and top walls of said one shell;

a tongue frame having top, bottom and end channels extending around the peripheral edge of the other shell and attached thereto, the top channel being spaced outwardly from the end channels;

said tongue frame having tongues extending toward said groove frame and adapted to engage said grooves, the top tongue being wider than the end tongues to provide a recess along the top of said luggage case; and hinge means pivoting said frames together at the bottom of said case.

6. A luggage case, as defined in claim 5, wherein the inner edges of said tongues are coplanar.

7. A luggage case, as defined in claim 5, including:
a handle attached to said top tongue at the center thereof;
releasable latch means attached to said top tongue adjacent opposite ends of said handle; and
catch means carried by said groove frame and adapted to engage said latch means when said sections are closed.

8. A luggage case, as defined in claim 5, wherein the inner edge of the top of each said shell is offset outwardly from the inner edges of the end walls thereof.

9. A luggage case, as defined in claim 5, wherein said channels of said tongue frame are integral.

10. A luggage case, as defined in claim 5, wherein:
said end channels of said groove frame and said tongue frame abut but said top channel of said groove frame and said top channel of said tongue frame are spaced apart when said case is closed; and
said groove frame and said tongue frame are each provided at the upper corners thereof with upwardly slanting surfaces facing the opposite frame.

11. A luggage case, as defined in claim 5, wherein said groove frame includes:
a flange extending from the inside of each of said end channels to form said end grooves; and
a flange extending from the inside of said top channel to form said top groove.

12. A luggage case, as defined in claim 11, wherein:
said end grooves and top groove of said groove frame are connected by oblique grooves; and said end tongues and top tongue of said tongue frame are connected to corresponding oblique tongues.

13. A luggage case, as defined in claim 12, wherein said channels of said groove frame and said channels of said tongue frame are arcuate at the upper corners.

14. A luggage case, as defined in claim 11, wherein said channels of said groove frame are integral.

15. A luggage case, as defined in claim 11, including friction linkage means at each side and each comprising:
a first arm pivoted at one end to said end channel of said groove frame adjacent the bottom channel thereof; and
a second arm pivoted at one end to said end channel of said tongue frame adjacent the bottom channel thereof;
the opposite ends of said first and second arms being pivoted together;
said end tongues of said tongue frame terminating at a position spaced from the bottom channel thereof and said end flanges of said groove frame terminating at a position spaced from the bottom channel thereof to provide clearance for said friction linkage means.

16. A luggage case comprising:
two opposed concave shells, each having a top wall, a bottom wall, end walls and a side wall;
a first frame having a pair of oppositely facing, spaced top channels, a bottom channel and dual end channels extending around the peripheral edge of one shell and attached thereto, each of the top channels being spaced outwardly from the end channels;
a second frame having top, bottom and end channels extending around the peripheral edge of the other shell and attached thereto, the top channels being spaced outwardly from the end channels;
said first frame having a tongue extending between said top channels thereof, to provide a recess along the top of said luggage case;
said end and top channels of said second frame interfitting with said end channels and one of said top channels of said first frame when said luggage case is closed; and
hinge means pivoting said frames together at the bottom of said case.

17. A luggage case as defined in claim 16, wherein each of said top channels is connected with each said end channel by a generally arcuate, oblique channel.

18. A luggage case as defined in claim 16, wherein said top, end and bottom channels of said first frame are integral.

19. A luggage case as defined in claim 16, wherein said top, end and bottom channels of said second frame are integral.

20. A luggage case, as defined in claim 16, including:
a handle attached to said top tongue at the center thereof;
releasable latch means attached to said top tongue adjacent opposite ends of said handle; and
catch means carried by said second frame and adapted to engage said latch means when said sections are closed.

References Cited by the Examiner

UNITED STATES PATENTS 1,404,368   1/22   Hastey _____ 190—16
3,112,018   11/63  Gehrie _____ 190—28

GEORGE O. RALSTON, *Primary Examiner.*